United States Patent
Butler, Jr.

(10) Patent No.: US 6,186,129 B1
(45) Date of Patent: Feb. 13, 2001

(54) ION SENSE BIASING CIRCUIT

(75) Inventor: Raymond O. Butler, Jr., Anderson, IN (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/365,568

(22) Filed: Aug. 2, 1999

(51) Int. Cl.[7] .............................. F02P 17/00; G01M 15/00
(52) U.S. Cl. ..................... 123/620; 73/35.08; 123/406.26
(58) Field of Search ................ 123/406.26, 406.29, 123/406.37, 406.34, 594, 620; 73/115, 35.08, 116, 35.01; 324/399, 464, 459

(56) References Cited

U.S. PATENT DOCUMENTS

| | | | |
|---|---|---|---|
| 5,180,984 | * 1/1993 | Murata et al. ...................... | 324/399 |
| 5,230,240 | * 7/1993 | Ohsawa et al. ..................... | 73/116 |
| 5,483,818 | * 1/1996 | Brandt et al. ...................... | 73/35.01 |
| 5,563,332 | * 10/1996 | Yasuda ................................ | 73/35.08 |
| 5,675,072 | 10/1997 | Yasuda et al. ...................... | 73/35.08 |
| 5,676,113 | 10/1997 | Johansson et al. .................. | 123/425 |
| 5,769,049 | 6/1998 | Nytomt et al. ...................... | 123/435 |
| 5,775,298 | 7/1998 | Haller ................................. | 123/425 |
| 5,785,020 | * 7/1998 | Takahasi et al. .................... | 123/424 |
| 5,803,047 | 9/1998 | Rask ................................... | 123/425 |
| 5,814,994 | 9/1998 | Hohner et al. ...................... | 324/380 |
| 5,866,808 | 2/1999 | Ooyabu et al. ..................... | 73/116 |
| 5,895,839 | * 4/1999 | Takahasi et al. .................... | 73/35.08 |
| 6,040,698 | * 3/2000 | Takahasi et al. .................... | 324/399 |
| 6,054,859 | * 4/2000 | Takahasi et al. .................... | 324/399 |
| 6,092,015 | * 7/2000 | Takahasi et al. .................... | 701/101 |

* cited by examiner

*Primary Examiner*—Henry C. Yuen
*Assistant Examiner*—Arnold Castro
(74) *Attorney, Agent, or Firm*—Margaret A. Dobrowitsky

(57) ABSTRACT

A biasing circuit for an ion current measurement system draws power from a primary side of the ignition coil, and applies a positive polarity bias voltage to a low voltage side of a secondary winding of the ignition coil. The biasing circuit includes a silicon-controlled rectifier (SCR) which has an on state for carrying spark current during a spark interval of operation, and further includes an off state which prevents the stored biasing voltage on a capacitor from being shunted to ground, thereby allowing ion current sensing through the low voltage side of the secondary winding. The low on-state voltage drop of the SCR during conduction of spark current minimizes losses of spark energy.

14 Claims, 2 Drawing Sheets

ION SENSE BIASING CIRCUIT

TECHNICAL FIELD

The present invention relates generally to a system for detecting a combustion condition in an internal combustion engine, and more particularly, to a system configured to develop a bias voltage for ion current measurement within a combustion chamber of the engine.

BACKGROUND OF THE INVENTION

It is desirable to detect a misfire condition (or a knock condition) during operation of an internal combustion engine. One approach taken in the art to detect misfire involves assessing the degree of engine speed (RPM) variation. Although such an approach does not require additional circuit components, it does require the availability of a microprocessor or the like and relatively extensive software to perform the evaluation, and, further, is incapable of producing accurate and reliable results over the entire engine speed and load range. In addition, one approach taken in the art for detecting knock involves the use of vibration knock sensors. Such an approach, however, involves, additional circuitry, including the sensors, which may be undesirable in certain circumstances.

In addition, so-called ion sense systems for detecting a combustion condition (e.g., misfire) are known. The combustion of an air/fuel mixture in an engine results in molecules in the cylinder being ionized. Applying a relatively high voltage across, for example, the electrodes of a spark plug just after the ignition operation is known to produce a current across the electrodes. Such current is known as ion current. The ion current that flows is proportional to the number of combustion ions present in the area of, for example, the spark plug gap referred to above, and is consequently indicative of the ionization throughout the entire cylinder as combustion occurs. The level or amount of ion current is indicative of a quality of the combustion event, or whether in fact combustion has occurred at all (e.g., a misfire condition). The level of an AC component of the ion current (e.g., at particular frequencies) may be used to determine knock.

Known ion current sensing systems generally include, in addition to an ignition coil, a capacitor or the like configured to store a voltage. The stored voltage is thereafter used as a "bias" voltage which is applied to the spark plug to generate the ion current. It is desirable to apply the bias voltage to the plug from the low voltage side of the secondary winding, rather than the high voltage side, to reduce the usage of high-voltage rated components. Accordingly, such biasing circuits are known that apply the biasing voltage to the low voltage side of a secondary winding of the ignition coil. However, known biasing circuits of this type incur substantial losses in spark energy. In particular, the bias voltage should be approximately 80–200 volts, and in one approach, the storage capacitor is disposed in parallel with a zener diode (having a reverse breakdown voltage in that range) between the low voltage end of the secondary and ground. Thus, during spark, the zener dissipates a relatively large amount of the spark energy (e.g., $V_{ZENER}*I_{SPARK}$) Compare this with the energy delivered by the plug (e.g., $V_{SPARK}*I_{SPARK}$ where $V_{SPARK}$ may be as low as 200 volts), and it may be seen that as much as $\frac{1}{3}$ to $\frac{1}{2}$ of the spark energy is lost.

There is therefore a need to provide an apparatus for detecting a combustion condition such as a misfire condition or a knock condition, particularly a biasing circuit for use in an ion sense system, that minimizes or eliminates one or more of the shortcomings as set forth above.

SUMMARY OF THE INVENTION

This invention provides for accurate and reliable detection of a combustion condition, such as a misfire condition (or a knock condition) at a relatively reduced cost (e.g., non-microprocessor based), as well as without incurring substantial losses in spark energy.

An apparatus is provided, in accordance with the present invention, suitable for use in detecting a combustion event in a cylinder of an internal combustion engine of the type having a spark plug proximate the cylinder. The apparatus includes an ignition coil, a switch, and a biasing circuit. The ignition coil includes a primary winding and a secondary winding. The primary winding has a first end coupled to a power supply and a second end coupled to the switch for selective connection to ground. The secondary winding has a first end, namely a high voltage end, coupled to the spark plug. The secondary winding further has a second end, namely a low voltage end, coupled to the biasing circuit. The switch is configured to cause a primary current to flow through the primary winding.

In function, the biasing circuit includes structure configured to bias the spark plug with a bias voltage for producing an ion current. The ion current is indicative of the combustion event. The biasing circuit, preferably, includes a silicon-controlled rectifier (SCR) with a gate terminal thereof floating. The SCR further has an anode terminal coupled to the low voltage end of the secondary winding. The SCR is configured to conduct a spark current from the secondary winding to ground when an ignition voltage at the anode terminal of the SCR reaches a predetermined level.

Advantageously, during conduction of the spark current, the voltage drop across the SCR is at a relatively low level. Accordingly, very little spark energy is lost in the biasing circuit. In the preferred embodiment, the biasing circuit also includes a capacitor which is initially charged to a predetermined voltage level from the low voltage side of the primary winding. This predetermined voltage level constitutes the bias voltage, which is applied through the low voltage side end of the secondary winding. While connection of the biasing circuit, in particular the capacitor, to the low voltage end of the secondary has the advantage of not requiring high-voltage rated components, it should be appreciated that the SCR provides a path to ground which, unless properly dealt with, might inadvertently allow discharge of the capacitor during the spark event itself. Therefore, in another aspect of the invention, a resistor is disposed between the capacitor and the low voltage end of the secondary that is valued such that the current sourced from the capacitor is limited to a predetermined level. This level is such so as to not keep the SCR in a conductive state. Therefore, during operation, the spark energy is allowed to be "rung out" until the spark current falls below a sustaining level of the SCR. The SCR then shuts off. With the SCR off, ion current flows from the capacitor/resistor through the secondary winding across the spark plug gap to ground. In a further embodiment, the magnitude of the ion current is sensed by a sensing resistor, which generates an ion sense signal. The sensing resistor is disposed between ground and the capacitor to form a complete circuit. The ion sense signal can thereafter be processed in a number of known ways to detect combustion condition (i.e., lack of a misfire condition) and a knock condition.

Other objects, features, and advantages of the present invention will become apparent to one skilled in the art from the following detailed description and accompanying drawings illustrating features of this invention by way of example, but not by way of limitation.

DESCRIPTION OF THE PREFERRED EMBODIMENT

Figure 1:
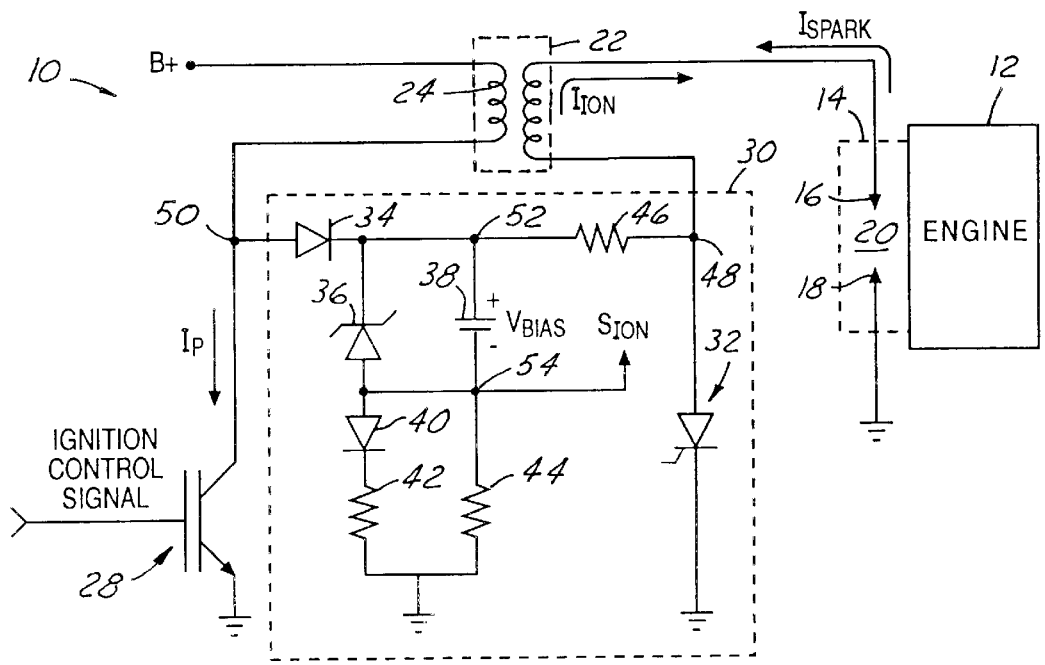
FIG. 1 is the simplified schematic and block diagram view of an apparatus in accordance with present invention.

Referring now to the drawings wherein like reference numerals are used to identify identical components in the various views, FIG. 1 illustrates an apparatus 10 for detecting a combustion condition, such as a misfire condition (or a knock condition) in an internal combustion engine 12.

Engine 12 is of the type having a spark plug 14 disposed proximate a combustion cylinder thereof (not shown). Spark plug 14, as is known, includes a first electrode 16, a second electrode 18 spaced from first electrode 16 to define a gap region 20 therebetween. Apparatus 10 includes an ignition coil 22 comprising a primary winding 24 and a secondary winding 26, means, such as transistor 28, for switching primary winding 24 to ground, and a biasing circuit 30. Biasing circuit 30 will be described in detail after a general description of the other components of apparatus 10.

Spark plug 14, particularly gap 20 thereof, is configured to produce a spark in response to an ignition voltage developed across secondary winding 26. The spark event, as is generally understood by those of ordinary skill in the art, is provided to ignite an air and fuel mixture introduced into the cylinder. During the spark event, a spark current, designated $I_{SPARK}$ in FIG. 1, flows across electrodes 18, 16, through secondary winding 26, and through biasing circuit 30 to a ground node. In addition, spark plug 14 is further configured so that when biased by a bias voltage $V_{BIAS}$, an ion current, designated $I_{ION}$ in FIG. 1, is carried across electrodes 16, 18. The magnitude of the ion current is indicative of a combustion condition, such as combustion (and/or misfire). In addition, the magnitude of an AC component of the ion current, for example, at particular frequencies, may be used to determine knock. In particular, the greater the ion current (i.e., due to an increased number of ionized molecules present in the cylinder), the more complete the combustion. In the illustrated embodiment, the biasing voltage is a relatively positive (with respect to ground) voltage. It is known in the art that for ion sense systems, a positive bias voltage results in a better ion current signal (e.g., greater magnitude, in one respect).

Ignition coil 22 is configured to function as a selectively controllable step-up transformer. One end, such as the high voltage side end of primary winding 24, is connected to a supply voltage provided by a power supply, such as a vehicle battery (not shown), hereinafter designated "B+" in the drawings. Supply voltage B+ may nominally be approximately 12 volts. A second end of primary winding 24, opposite the high side end, is connected to a switching device, such as transistor 28. A first end of secondary winding 26, namely the high voltage end, is coupled to spark plug 14. A second end of secondary winding 26, opposite the high voltage end, namely a low voltage end, is connected to biasing circuit 30. As will be described in detail hereinafter, biasing circuit 30 selectively connects the low voltage end of secondary winding 26 to ground. Primary winding 24 and secondary winding 26 are matched in a predetermined manner known in the art.

Switch 28 is provided to selectively connect primary winding 24 to ground in accordance with an ignition control signal applied thereto. In the illustrated embodiment, switch 28 is an insulated gate bipolar transistor (IGBT) having a collector terminal connected to ignition coil 22, an emitter terminal connected to a ground node, and a gate terminal configured to receive the ignition control signal. Such a connection to ground, as is known generally in the art, will cause a primary current $I_p$ to flow through primary winding 24. Switch 28 is illustrated in the Figures as an IGBT; however, it should be understood that such illustration is exemplary only and not limiting in nature. Switch 28 may comprise alternative conventional components known to those of ordinary skill in the art.

Coil 22 and switch 28 together define the means for selectively storing energy, preferably in a predetermined amount, and thereafter transferring the stored energy to spark plug 14 in accordance with the ignition control signal.

With continued reference to FIG. 1, biasing circuit 30 is configured generally to bias spark plug 14 with a bias voltage to produce an ion current $I_{ION}$ indicative of a combustion event. As illustrated, biasing circuit 30 is coupled between the low voltage end of primary winding 24, the low voltage end of secondary winding 26 and ground. Biasing circuit 30 includes means, such as a silicon-controlled rectifier (SCR) 32, for carrying a spark current, a first diode 34, a zener diode 36, a capacitor 38, a second diode 40, a first resistor 42, a second resistor 44, and a third resistor 46.

SCR 32 includes an anode terminal coupled to the low voltage end of secondary winding 26 at node 48, and a cathode terminal coupled to ground. In the illustrated embodiment, SCR 32 further includes a gate terminal; however, the gate terminal is left floating. SCR 32 is configured to conduct the spark current $I_{SPARK}$ through secondary winding 26 when an ignition voltage at its anode terminal (relative to its cathode terminal) reaches a predetermined breakover voltage level. The anode terminal of SCR 32 and the low voltage end of secondary winding 26 are electrically connected at common node 48. SCR 32 may be selected from a plurality of known, conventional components, and may be a non-sensitive gate SCR, component model MCR218-10 manufactured by Motorola Semiconductor Products, Austin, Texas, and which is specified to have a nominal blocking voltage of 800 volts and a typical holding current specified at 16 mA. During conduction, SCR 32 has a typical voltage drop (anode-to-cathode) of 1–2 volts. Thus, when carrying spark current, very little spark energy is lost in biasing circuit 30 (e.g., $V_{DROP}*I_{SPARK}$).

Diode 34 has an anode terminal connected to a node 50 common to the collector of transistor 28, and the low voltage end of primary winding 24. Diode 34 further includes a cathode terminal connected to another common node 52. Diode 34 may comprise conventional components known to those of ordinary skill in the ignition art, and may be a fast recovery diode, component model MUR160 from Motorola Semiconductor Products, Austin, Tex., having a one (1) ampere capacity, and a reverse recovery time of 50 nanoseconds (ns) maximum.

Zener diode 36 is configured to establish a bias voltage $V_{BIAS}$ across capacitor 38 at a predetermined level. That is, zener diode 36 has a nominal cathode-to-anode reverse breakdown voltage associated therewith which establishes, substantially, the voltage across capacitor 38. Zener diode 36 has a cathode terminal connected to common node 52. Zener diode 36 has an anode terminal connected to an output node 54. In the illustrated embodiment, zener diode 36 may be a 100 volt zener diode, commercially available as component model number 1N6295A, available from Motorola Semiconductor Products, Austin, Tex.

Capacitor 38 is configured to be charged to a bias voltage $V_{BIAS}$ using energy available from a leakage inductance spike from the low voltage end of primary winding 24 when primary current $I_p$ is interrupted. Thereafter, capacitor 38 provides the stored voltage across spark plug gap 20 by way of resistor 46 and secondary winding 26. The ion voltage bias generates the ion current $I_{ION}$. Capacitor 38 may comprise conventional components known to those of ordinary skill in the art, and in the illustrated embodiment may have a value of 0.1 $\mu$F. Capacitor 38 is connected electrically in parallel relationship with zener diode 36.

Diode 40, and resistor 42 are arranged in a series relationship between output node 54 and a ground node. The combination of diode 40 and resistor 42 is configured to allow a charging current to flow therethrough to ground for charging capacitor 38. As illustrated, the anode terminal of diode 40 is connected to output node 54, with the cathode terminal being connected to a node common with resistor 42. Diode 40, and resistor 42 may comprise conventional components known to those of ordinary skill in the ignition art. In the illustrated embodiment, diode 40 may be a commercially available component, such as component model number 1N4003 available from Motorola Semiconductor Products, Austin, Tex. Resistor 42, in the illustrated embodiment, may have a value of approximately 470 ohms.

Sensing resistor 44 provides the means for generating the ion sense signal $S_{ION}$. Resistor 44 is connected between output node 54 and ground. The voltage on output node 54 defines an ion sense signal $S_{ION}$ The ion sense signal $S_{ION}$ is representative of the ion current $I_{ION}$. Sensing resistor 44 may comprise conventional components, and, in the illustrated embodiment, may have a value of approximately 51k ohms.

Resistor 46 is configured in biasing circuit 30 to provide the means for limiting the level of current discharging from capacitor 38. In particular, limiting resistor 46 limits the current from capacitor 38 through resistor 46 to a level below a holding current parameter associated with SCR 32. This limiting of current is particularly important during a discharge interval. The discharge interval occurs during the conduction of SCR 32, which includes the spark event itself. In particular, during the spark event, the spark current $I_{SPARK}$ flows through secondary winding 26, through SCR 32 to ground. The path from node 48 to ground is electrically available for capacitor 38 (as charged to $V_{BIAS}$), and limiting resistor 46. Through appropriate configuration of resistor 46 and capacitor 38, during this interval, only a small amount of current will discharge from capacitor 38 through resistor 46, through SCR 32 to ground; however, the value of this small current is below the holding current parameter associated with SCR 32. Accordingly, when the spark energy is substantially "rung out," the spark current $I_{SPARK}$ will diminish. When $I_{SPARK}$ falls below the holding current level (i.e., generally in the milliamp range), SCR 32 will shut off automatically. The current sourced from capacitor 38/resistor 46 is in the microamp range, due to, among other factors, the value of limiting resistor 46. The small discharge current will therefore not interfere with the proper conduction, and termination of conduction of SCR 32 for its function (i.e., for the carrying of the spark current). Once SCR 32 is off, the path to ground is no longer available, and the bias voltage $V_{BIAS}$ is thus applied across the spark electrodes via resistor 46, and winding 26. The value of limiting resistor 46 may be several hundred thousand ohms, and, in the illustrated embodiment, is approximately 100 k ohms.

In sum, the configuration of biasing circuit 30 allows capacitor 38 to be charged to an appropriately high voltage level for ion sense biasing without (i) undue loss of spark energy; and (ii) premature discharge of the stored bias voltage.

Figure 2A:
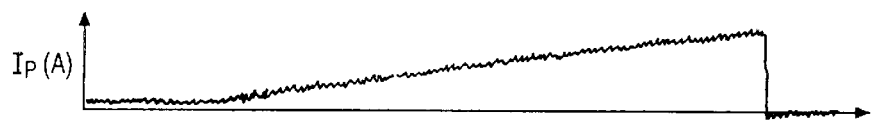
FIGS. 2A–2B are timing diagram views of various signals in the embodiment shown in FIG. 1 in preparation for, and at the commencement of, a spark event.
Figure 2B:
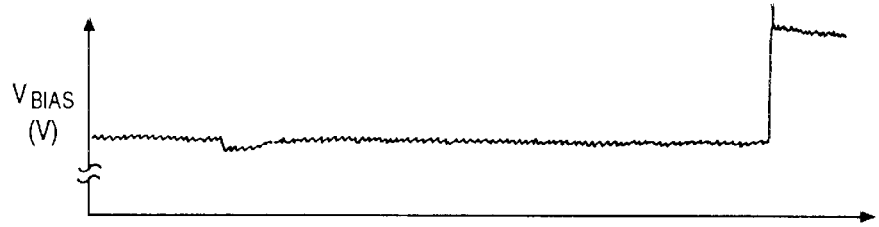
Figure 2C:

Referring now to FIGS. 2A–2C, in operation, a control circuit (not shown) determines when to assert an ignition control signal according to a known operating strategy. The ignition control signal is applied to switch 28 to commence a "dwell" interval (i.e., begin charging of ignition coil 22 by causing a primary current Is to flow through primary winding 24). The rise of primary current $I_p$ is shown in FIG. 2A. After ignition coil 22 has been charged to a desired level, the control circuit (not shown) discontinues the ignition control signal, thus turning switch 28 off. The leakage inductance caused thereby produces a relatively high voltage ("leakage inductance spike") to be generated at node 50 (winding end). This voltage "spike" is shown in FIG. 2C.

This voltage spike forward biases diode 34. Zener diode 36 breaks down at the selected reverse breakdown voltage. Current therefore flows from node 50, through diode 34, through zener diode 36 (in breakdown), further through diode 40 and resistor 42 to ground. Current from the spike also charges capacitor 38 wherein the capacitor 38 voltage level is substantially equal to the reverse breakdown level of zener diode 36. As described, the value of resistor 42 may be substantially less than the value of resistor 44 to provide a low resistance path for the charging of capacitor 38. From the foregoing, a biasing voltage $V_{BIAS}$ is established across capacitor 38 from the primary side of ignition coil 22. The charging of capacitor 38 is shown in FIG. 2B.

Figure 3A:
FIGS. 3A–3C are timing diagram views showing, in greater detail, the signal waveforms shown in FIGS. 2A–2C, respectively.
Figure 3B:
Figure 3C:
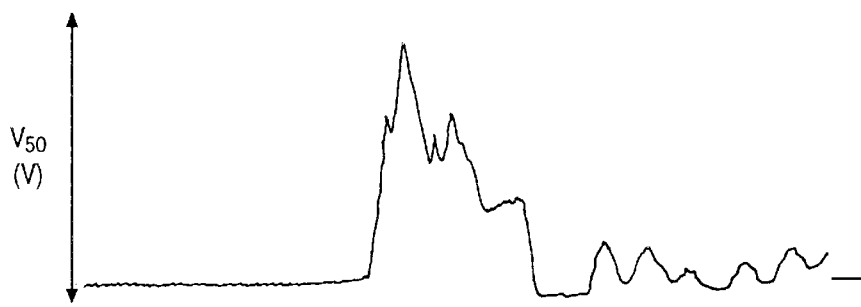

FIGS. 3A–3C show, in greater detail, portions of the waveforms illustrated in FIGS. 2A–2C. In particular, the magnitude of the voltage on node 50 may be several hundred volts (e.g., 600 volts), while the voltage across capacitor 38 will be established by the reverse breakdown voltage of zener 36 (e.g., 100 volts). The primary current may be approximately 10A.

Figure 4A:
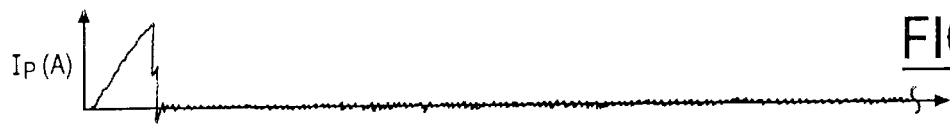
FIGS. 4A–4C are timing diagram views showing various signals in the embodiment of FIG. 1, including an ion sense signal for a combustion event, and a non-combustion (misfire) event.
Figure 4B:
Figure 4C:
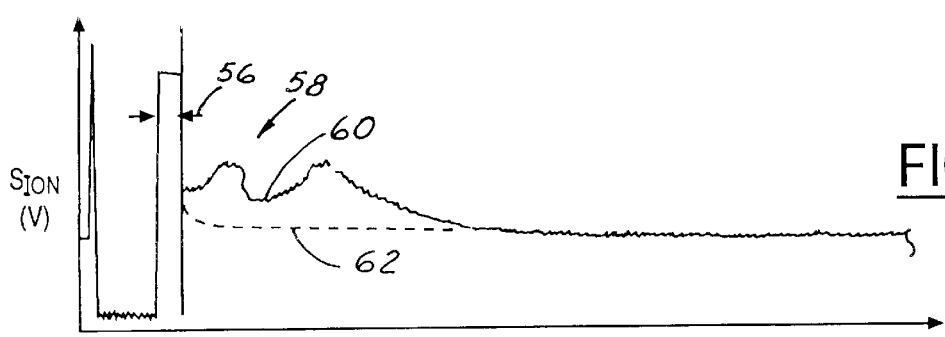

FIGS. 4A–4C are timing diagram views illustrating signals at various points in the embodiment shown in FIG. 1. FIG. 4A shows the magnitude of the primary current $I_p$ with respect to time. FIG. 4B shows the magnitude of the capacitor voltage (e.g., $V_{BIAS}$) in timed relation to the primary current. FIG. 4C shows the ion sense signal $S_{ION}$ in timed relation to both the primary current signal and the capacitor voltage signal.

In particular, during operation, the gate terminal of SCR 32 is floating. The high voltage associated with the spark event is sufficient to cause SCR 32 to conduct with no gate signal applied thereto. During the spark event, a secondary current (i.e., the spark current $I_{SPARK}$) flows through secondary winding 26, SCR 32, and then to ground. In accordance with the present invention, it should be noted that a voltage drop across SCR 32 is relatively small, which may be only about 1–2 volts. In combination with the spark current, it should be understood that, unlike conventional approaches, no substantial losses in spark energy occurs. More particularly, known ion sense biasing circuits in the art that charge a capacitor using a high voltage zener breakdown dissipate a substantial amount of the spark energy. This is because to store the ion sense biasing voltage required to adequately employ ion sensing, a zener diode having corresponding reverse breakdown voltage is used. The power losses in such a biasing circuit are substantial (e.g., 100 volts×$I_{SPARK}$), compared to the present invention (e.g., 1 volt×$I_{SPARK}$).

Also, during the discharge interval 56 is FIG. 4C, a path to ground is electrically available to capacitor 38; however, the current being discharged from capacitor 38 is relatively small due to limiting resistor 46, and is less than the minimum amount of sustaining current (e.g., holding current) required by SCR 32 to remain in a conductive or "ON" state. Moreover, capacitor 38 voltage is preserved for the immediately following ion sense interval 58. Accordingly, after the spark event ends and the last of the spark energy is "rung out," capacitor 38 is unable to discharge through SCR 32. It warrants noting that the voltage established across capacitor 38 is selected so as to be of insufficient magnitude to independently reach the breakover threshold associated with SCR 32. Therefore, after the last of the spark energy is "rung out," SCR 32 will stop conducting. With SCR 32 off, ion current $I_{ION}$ will flow through secondary winding 26, across gap 20, to ground, and back through sensing resistor 44, and capacitor 38. The magnitude of the ion current results in a voltage being developed at output node 54, in the form of an ion sense signal $S_{ION}$.

As shown in FIG. 4C, this occurs during sensing interval 58 immediately following the discharge interval 56. As further shown in FIG. 4C, waveform 60 (solid line) is indicative of combustion in the cylinder, due to an increased magnitude in the ion sense signal $S_{ION}$. Waveform 62 (shown in dashed-line format) is indicative of when combustion does not occur (e.g., misfire). This lack of combustion is illustrated by a reduced magnitude of waveform 62.

The ion sense signal $S_{ION}$ may be processed in a plurality of known ways to detect combustion (i.e., lack of misfire, misfire, a knock condition, etc.). Various circuits are known in the art for accomplishing these functions based on an input ion sense signal.

A biasing circuit in accordance with the present invention is suitable for use in an ion sense system which may be used to detect combustion (or lack thereof—misfire) based on the level of an ion sense signal corresponding to an ion current. In addition, the level of the AC component of the ion current at a specific frequency may be used to determine a knock condition. Advantageously, the biasing circuit in accordance with the present invention draws power from the primary side of the ignition coil, and further, applies a voltage bias having a positive polarity across the spark plug gap from the low voltage side of the secondary winding. Applying the positive ion sense bias from the low voltage side of the secondary winding eliminates the need for a variety of high voltage components in the biasing circuit. Moreover, in a preferred embodiment, a silicon-controlled rectifier (SCR) is used, which eliminates the shortcomings of the prior art biasing circuits, which incur substantial losses in spark energy during the spark event.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

What is claimed is:

1. An apparatus for detecting a combustion event in a cylinder of an internal combustion engine having a spark plug proximate said cylinder, said apparatus comprising:
   an ignition coil having a primary winding and a secondary winding, said primary winding having a first end coupled to a power supply, said secondary winding having a first end coupled to said spark plug;
   a switch coupled to a second end of said primary winding opposite said first end, said switch being configured to cause a primary current to flow through said primary winding;
   a biasing circuit coupled to said second end of said primary winding and said second end of said secondary winding and configured to bias said spark plug with a bias voltage for producing an ion current indicative of the combustion event, said biasing circuit including a silicon-controlled rectifier (SCR) having an anode coupled to said second end of said secondary winding and configured to conduct a spark current through said secondary winding when an ignition voltage at said anode of said SCR reaches a predetermined level.

2. The apparatus of claim 1 wherein said biasing circuit is further configured to generate an ion sense signal on an output node thereof representative of said ion current.

3. The apparatus of claim 2 wherein said biasing circuit includes a sensing resistor to generate said ion sense signal.

4. The apparatus of claim 1 wherein said biasing circuit includes:
   means for storing said bias voltage; and,
   means intermediate said storing means and said second end of said secondary winding for limiting a discharge current from said storing means through said SCR.

5. The apparatus of claim 4 wherein said limiting means comprises a resistor.

6. The apparatus of claim 5 wherein a level of said discharge current is less than a holding current parameter associated with said SCR.

7. The apparatus of claim 1 wherein said biasing circuit further includes:
   a first diode having an anode connected to said second end of said primary winding and a cathode connected to a common node;
   a zener diode having an anode coupled to an output node and a cathode coupled to said common node;
   a capacitor in parallel relationship with said zener diode;
   a second diode and a first resistor in series relationship between said output node and a ground node wherein said second diode has an anode coupled to said output node;
   a second resistor coupled between said output node and said ground node; and,
   a third resistor coupled between said common node and said SCR anode.

8. The apparatus of claim 7 wherein said zener diode has a nominal cathode-to-anode reverse breakdown voltage associated therewith substantially equal to said bias voltage.

9. The apparatus of claim 7 wherein said capacitor is configured to provide said bias voltage.

10. An apparatus for detecting a combustion event in a cylinder of internal combustion engine having a spark plug proximate said cylinder, said apparatus comprising:

an ignition coil having a primary winding and a secondary winding, said primary winding having a first end coupled to a power supply, said secondary winding having a first end coupled to said spark plug;

means coupled to a second end of said primary winding for causing a primary current to flow through said primary winding;

means coupled to a second end of said secondary winding for biasing said spark plug with a bias voltage to produce an ion current indicative of said combustion event, said biasing means comprising means for carrying a spark current through said secondary winding to a ground node when an ignition voltage at said second end of said secondary winding initially reaches a pre-determined threshold; wherein said means for carrying a spark current comprise a silicon-controlled rectifier (SCR) having an anode coupled to said second end of said secondary winding.

11. The apparatus of claim 10 wherein said biasing means further includes means for generating an ion sense signal on an output node thereof in response to said ion current.

12. The apparatus of claim 11 wherein said generating means comprises a sensing resistor.

13. The apparatus of claim 10 wherein said biasing means further includes:

means for storing said bias voltage; and, means intermediate said storing means and said SCR anode for limiting a discharge current from said storing means through said SCR to a level less than a holding current parameter associated with said SCR.

14. The apparatus of claim 10 wherein said biasing means includes:

a first diode having an anode connected to said second end of said primary winding and a cathode connected to a common node;

a zener diode having an anode coupled to an output node and a cathode coupled to said common node;

a capacitor connected between said output node and said common node;

a second diode and a first resistor in series relationship between said output node and a ground node wherein said second diode has an anode coupled to said output node;

a second resistor coupled between said output node and said ground node; and, a third resistor coupled between said common node and said second end of said secondary winding.

\* \* \* \* \*